US006809834B1

(12) United States Patent
Sato

(10) Patent No.: US 6,809,834 B1
(45) Date of Patent: Oct. 26, 2004

(54) IMAGE FORMING APPARATUS

(75) Inventor: Masaki Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/327,507

(22) Filed: Jun. 8, 1999

(30) Foreign Application Priority Data

Jun. 9, 1998 (JP) ............................................ 10-160243

(51) Int. Cl.$^7$ ................................................ G06F 15/00
(52) U.S. Cl. .................... 358/1.16; 358/1.15; 358/1.17; 358/404
(58) Field of Search ............................. 358/1.16, 1.17, 358/404, 523, 444; 710/26

(56) References Cited

U.S. PATENT DOCUMENTS 5,381,163 A * 1/1995 Yokoyama ................. 345/658
5,408,615 A * 4/1995 Ishikawa ..................... 710/26
5,870,535 A * 2/1999 Duffin et al. ............... 358/1.16

* cited by examiner

Primary Examiner—Twyler Lamb
(74) Attorney, Agent, or Firm—Oblon, Spivak, McClelland, Maier & Neustadt, P.C.

(57) ABSTRACT

An image forming apparatus includes an image forming section, a page memory for storing at least one page of image data to be transferred to the image forming section, and a DMA (Direct Memory Access) controller. The page memory is implemented by a DRAM (Dynamic Random Access Memory). The DMA controller continuously transfers, in response to a single DMA request received from the image forming section, a plurality of words of image data with the same row address from the DRAM to the image forming section at a time by DMA transfer. The apparatus is capable of transferring image data from the DRAM to the image forming section at a high speed by DMA transfer. This is also true when the image data are rotated by 90 degrees or 270 degrees. Further, the apparatus is capable of accurately setting a position where the image forming section starts recording image data on a line.

11 Claims, 9 Drawing Sheets

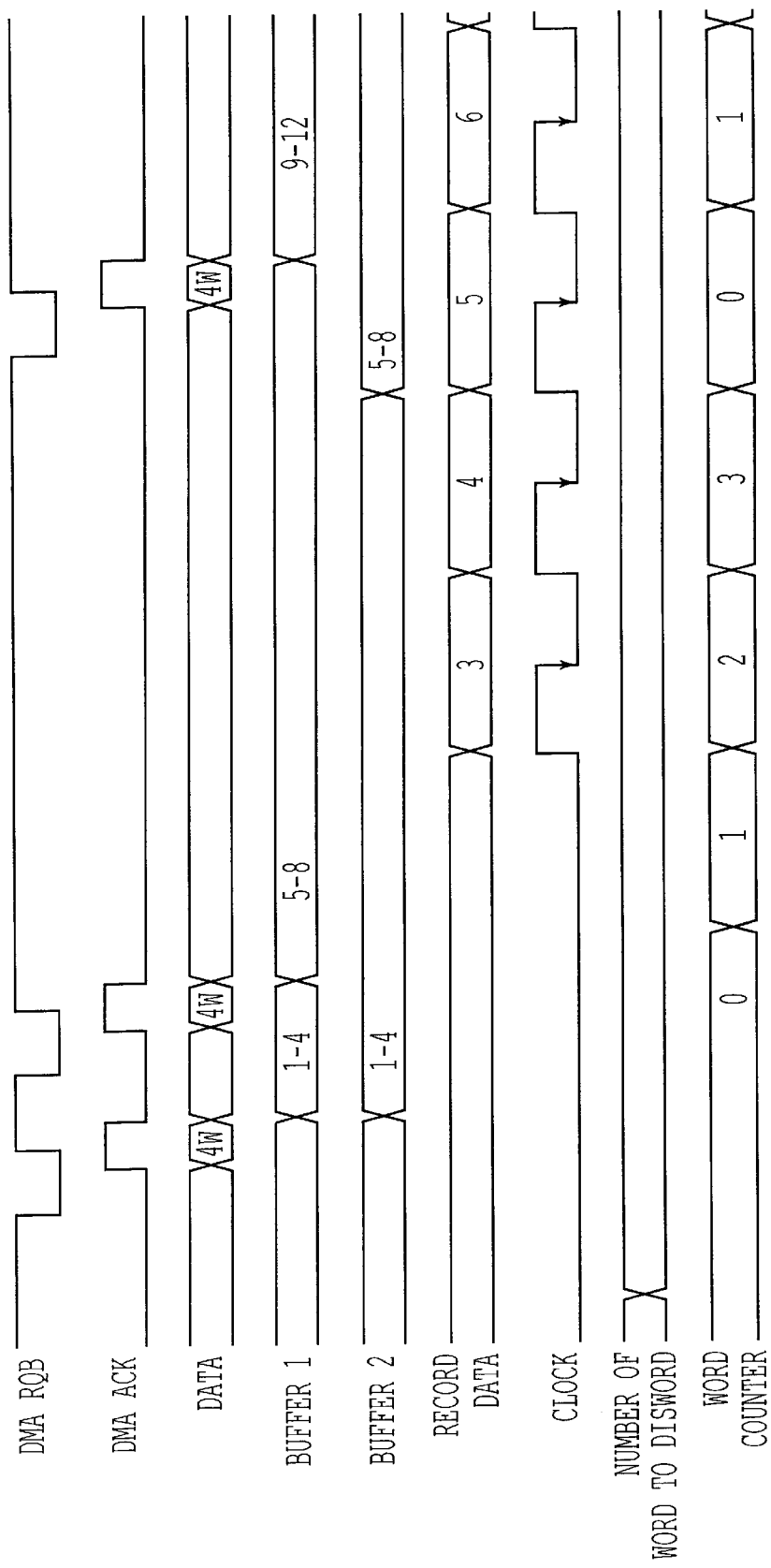

IMAGE FORMING APPARATUS

BACKGROUND OF THE INVENTION

The present invention relates to a facsimile apparatus, printer, digital copier or similar image forming apparatus.

A facsimile apparatus, for example, includes a plotter or image forming means for recording image data on a paper or similar recording medium. For this purpose, the facsimile apparatus needs a page memory capable of accommodating at least one page of image data. It is a common practice with the facsimile apparatus to transfer image data from the page memory to the plotter without the intermediary of a CPU (Central Processing Unit), i.e., by a DMA (Direct Memory Access) system. The DMA system allows the CPU to efficiently execute processing other than one for the data transfer from the page memory to the plotter and thereby increases the image forming speed. The page memory is, in many cases, implemented by a DRAM (Dynamic Random Access Memory) which is most desirable from the cost standpoint.

To further increase the image forming speed, it is necessary to increase the DMA transfer rate of the image data from the page memory to the plotter. In practice, however, the image data transfer rate has heretofore been limited due to the capacity of the page memory.

SUMMARY OF THE INVENTION

It is therefore an object of the present invention to provide an image forming apparatus capable of increasing the DMA transfer rate of image data from a page memory or DRAM to image forming means.

An image forming apparatus of the present invention includes an image forming section, a page memory for storing at least one page of image data to be transferred to the image forming section, and a DMA controller. The page memory is implemented by a DRAM. The DMA controller continuously transfers, in response to a single DMA request received from the image forming section, a plurality of words of image data with the same row address from the DRAM to the image forming section at a time by DMA transfer.

BRIEF DESCRIPTION OF THE DRAWINGS

The above and other objects, features and advantages of the present invention will become more apparent from the following detailed description taken with the accompanying drawings in which:

FIGS. 8 and 9 demonstrate still another specific DMA transfer procedure to be executed by the DMA controller of the illustrative embodiment.

DESCRIPTION OF THE PREFERRED EMBODIMENT

Figure 1:
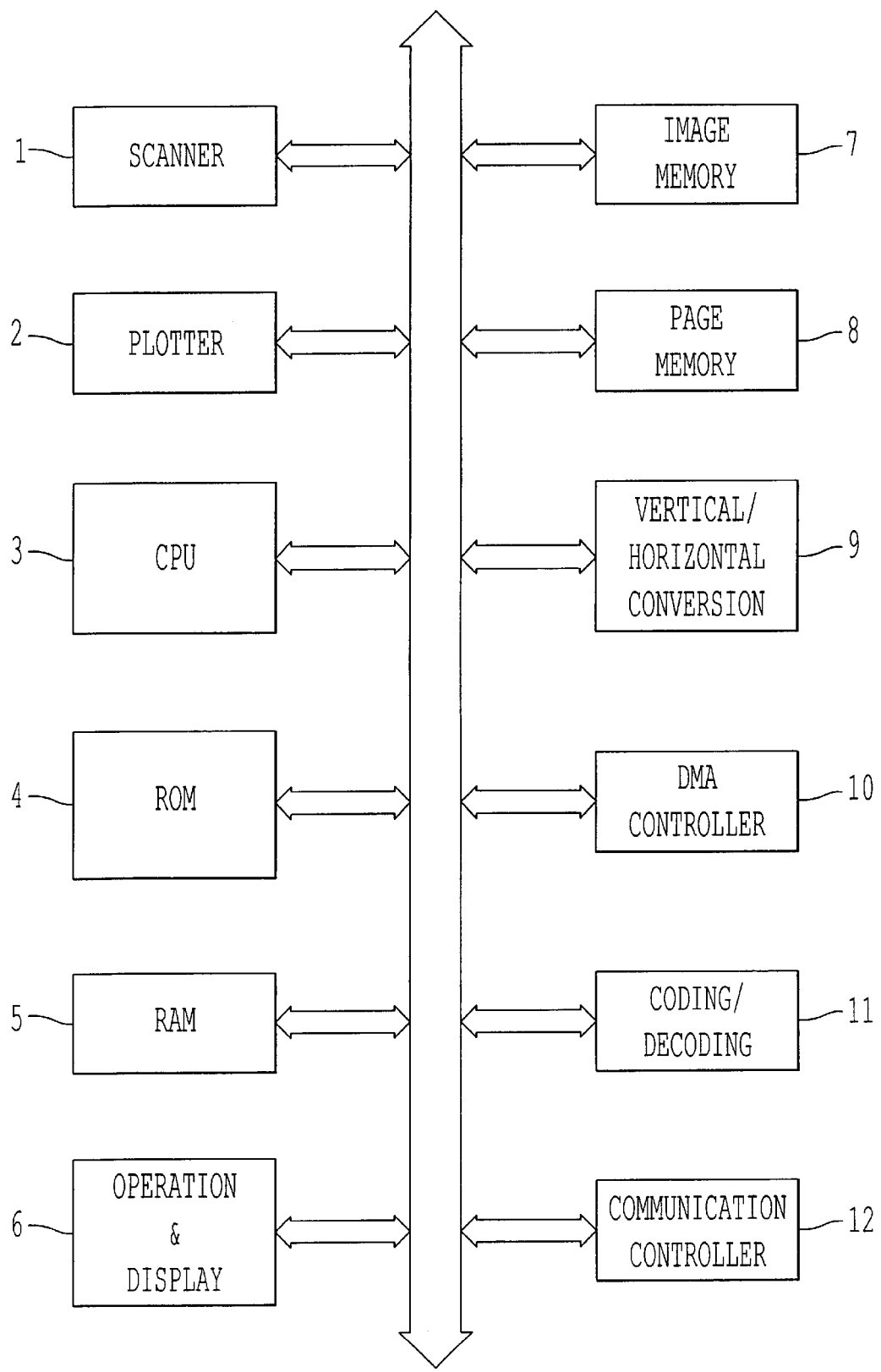
FIG. 1 is a block diagram schematically showing a control system included in an image forming apparatus embodying the present invention.

Referring to FIG. 1 of the drawings, a control system included in an image forming apparatus embodying the present invention is shown. The image forming apparatus is implemented as a facsimile apparatus by way of example. As shown, the control system includes a scanner 1, a plotter 2, a CPU 3, a ROM (Read Only Memory) 4, a RAM 5, an operation and display 6, an image memory 7, a page memory 8, a vertical/horizontal conversion 9, a DMA controller 10, a coding/decoding 11, and a communication controller 12.

The scanner 1 reads image data out of a document. The plotter 2 uses, e.g., a laser for recording one page of image data on a paper or similar recording medium by line-by-line scanning. The CPU 3 executes total control over the entire facsimile apparatus. The ROM 4 stores a control program to be executed by the CPU 3. The RAM 5 is used by the CPU 3 as a work memory, among others.

The operation and display 6 is generally made up of an operating section and a display section. The operating section includes keys to be manipulated by the operator for operating the apparatus. The display section includes an LCD (Liquid Crystal Display) and LEDs (Light Emitting Diodes) for informing the operator of the statuses of the apparatus. The image memory 7 is a read/write memory capable of storing image data received in the form of coded data compressed by, e.g., MH/MR/MMR or image data to be sent.

The page memory 8 is capable of storing at least one page of image data (coded data) to be fed to the plotter 2. In the illustrative embodiment, the page memory 8 is implemented by a high-speed page mode or fast page mode DRAM (Dynamic Random Access Memory) or an EDO (Extended Data Out) mode or hyperpage mode DRAM although it may alternatively be implemented by an SDRAM. The vertical/horizontal conversion or vertical/horizontal converting means 9 sequentially converts one page of image data stored in the page memory 8 in the vertical/horizontal direction block by block, as will be described specifically later. In the illustrative embodiment, a single block is a square block including a plurality of words.

The DMA controller or DMA control means 10 continuously transfers image data, a plurality of words at a time, from the pager memory (DRAM) 8 to the plotter 2 by the DMA scheme. Also, the DMA controller 10 continuously transfers the above image data from the pager memory 8 to the vertical/horizontal conversion 9 by the DMA scheme. Further, the DMA controller 10 continuously transfers the image data, a plurality of words at a time, from the horizontal/vertical conversion 9 to the page memory 8.

The coding/decoding 11 selectively codes image data or decodes coded image data to thereby produce original data. The communication controller 12 controls communication of the facsimile apparatus with another facsimile apparatus or an apparatus including a facsimile function.

Image data (coded data) received by the communication controller 12 is decoded by the coding/decoding 11. The resulting original data are sequentially written to the page memory 8 line by line and then transferred to the plotter 2.

The DRAM, which is a page memory most desirable from the cost standpoint, is operable in the high-speed page mode or fast page mode or the EDO mode or hyperpage mode.

With such a mode, the DRAM is capable of continuously transferring a plurality of words of image data having the same row address at a high speed by sequentially switching the column address.

The EDO mode is an improved version of the high-speed page mode in that the former implements slightly higher access than the latter. A single DRAM has either one of the high-speed page mode and EDO mode. Specifically, the difference between the high-speed page mode and the EDO mode is whether or not read data is output even when a CAS (Column Address Strobe) is inactivated. The EDO mode implements slightly higher access than the high-speed page mode because it is capable of inactivating the CAS more rapidly than the high-speed page mode.

Figure 2:
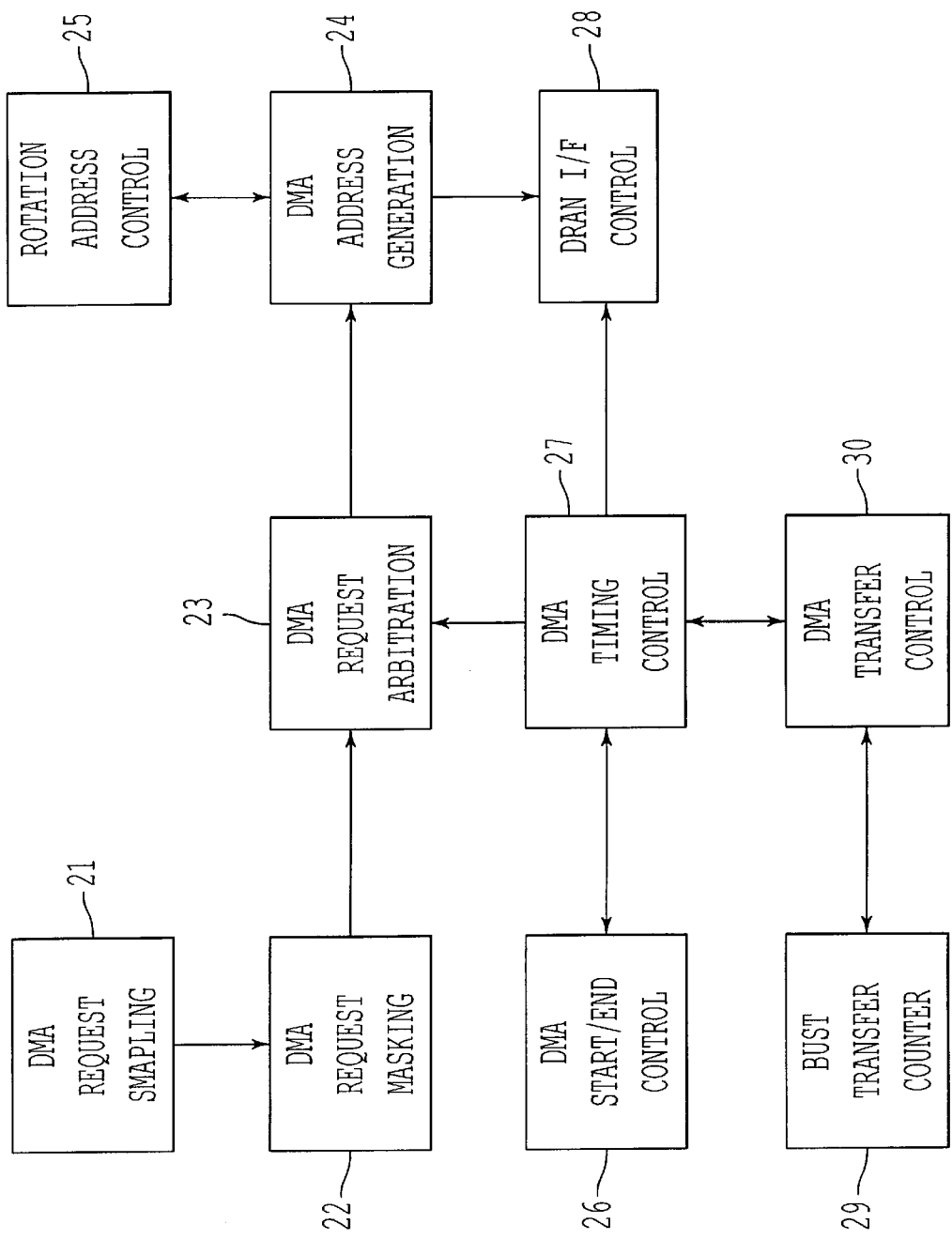
FIG. 2 is a schematic block diagram showing a specific configuration of a DMA controller included in the control system of FIG. 1.

FIG. 2 shows a specific configuration of the DMA controller 10. As shown, the DMA controller 10 includes a DMA request sampling 21, a DMA request masking 22, a DMA request arbitration 23, a DMA address generation 24, a rotation address control 25, a DMA start/end control 26, a DMA timing control 27, a DRAM interface (I/F) control 28, a burst transfer counter 29, and a DMA transfer control 30.

The DMA request sampling 21 samples a DMA request received from, e.g., the plotter 2. The DMA request masking 22 masks the DMA request in order to end DMA. The DMA request arbitration 23 accepts, when a plurality of DMA requests appear at the same time, only one of them in accordance with a preselected priority order or similar algorithm. The DMA address generation 24 generates, or calculates, the addresses of the memory (DRAM).

The rotation address control 25 generates discontinuous addresses when image data should be rotated. More specifically, the control 25 generates addresses for transferring image data subjected to conversion by the vertical/horizontal conversion 9 to the plotter 2 by rotating them by 90 degrees or 270 degrees. If desired, the function of this control 25 may be included in the DMA address generation 24. The DMA start/end control 26 controls the start and end of DMA transfer of image data. The DMA timing control 27 controls the timing of the entire DMA procedure.

The DRAM I/F control 28 controls the interface between the DRAM and the address multiplex timing, EDO mode (or high-speed page mode) timing, etc. The burst transfer counter 29 counts burst transfers effected in the EDO mode (or the high-speed page mode). The DMA transfer control 30 controls the number of all DMA transfers, including the burst transfers, while counting them.

Figure 3:
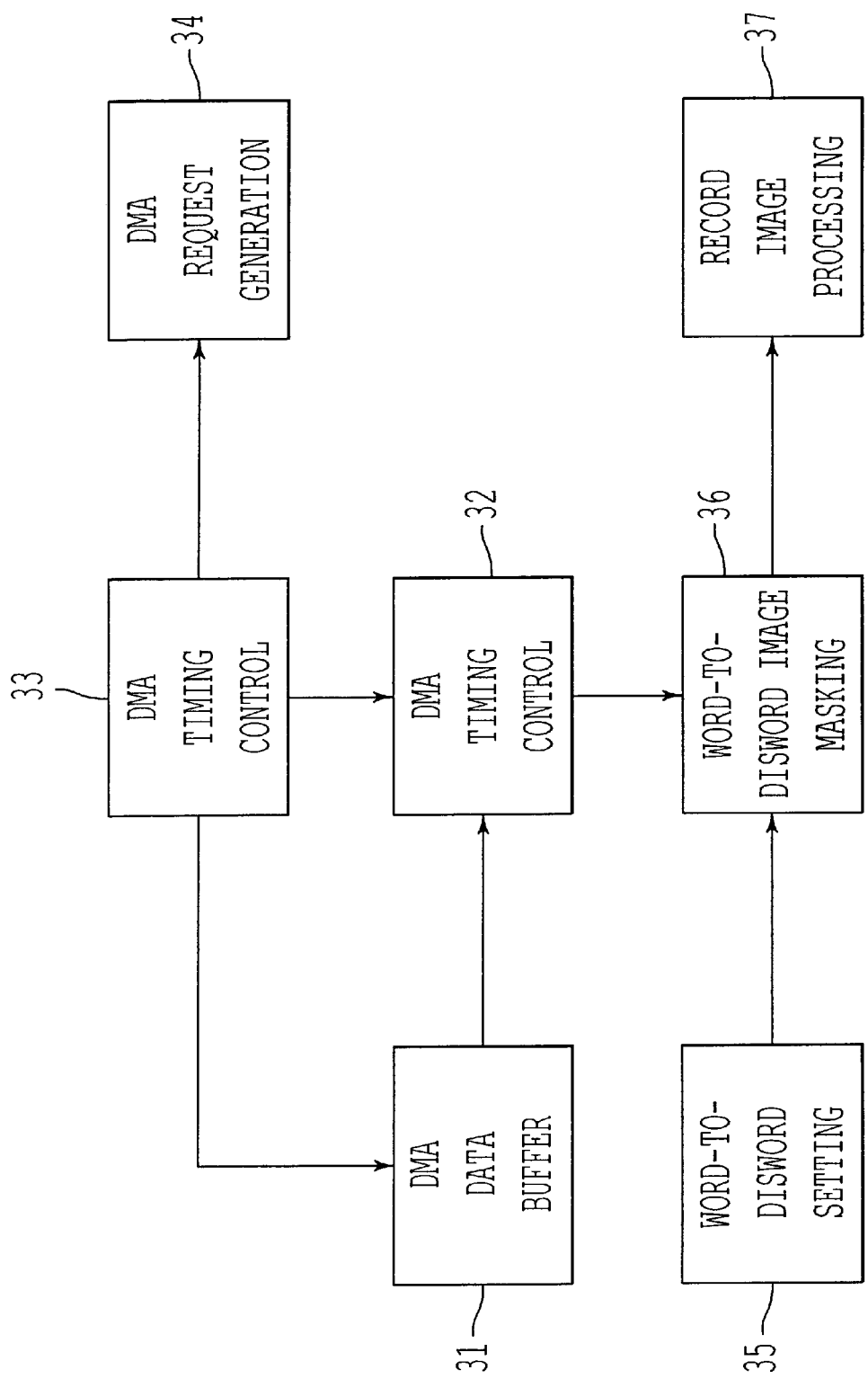
FIG. 3 is a schematic block diagram showing a specific plotter control arrangement also included in the control system of FIG. 1.

FIG. 3 shows a specific control arrangement included in the plotter 2. As shown, the control arrangement includes DMA data buffers 31 and 32, a DMA timing control 33, a DMA request generation 34, a word-to-discard setting 35, a word-to-discard image masking 36, and a record image processing 37.

The DMA data buffer 31 allows image data to be written thereto by DMA transfer. The other DMA data buffer 32 is used to transfer image data in synchronism with a write clock fed to a parallel-to-serial conversion circuit, not shown, included in the plotter 2. The DMA timing control 33 controls the DMA transfer timing. The DMA request generation 34 generates a DMA request when the DMA data buffer 31 becomes empty.

The word-to-discard setting 35 sets, in response to a command from the CPU 3, a number of words to discard, i.e., a number of words smaller than the number of words of image data to be continuously transferred by the DMA controller 10 by DMA transfer (burst transfer). The word-to-discard image masking 36 masks (discards), among the image data transferred by DMA transfer by the DMA controller 10, the number of words of image data set by the word-to-discard setting 35, as counted from the head of a line. The record image processing 37 performs image processing for rendering serial image data output from the parallel-to-serial conversion circuit of the plotter 2 clear.

Figure 4:
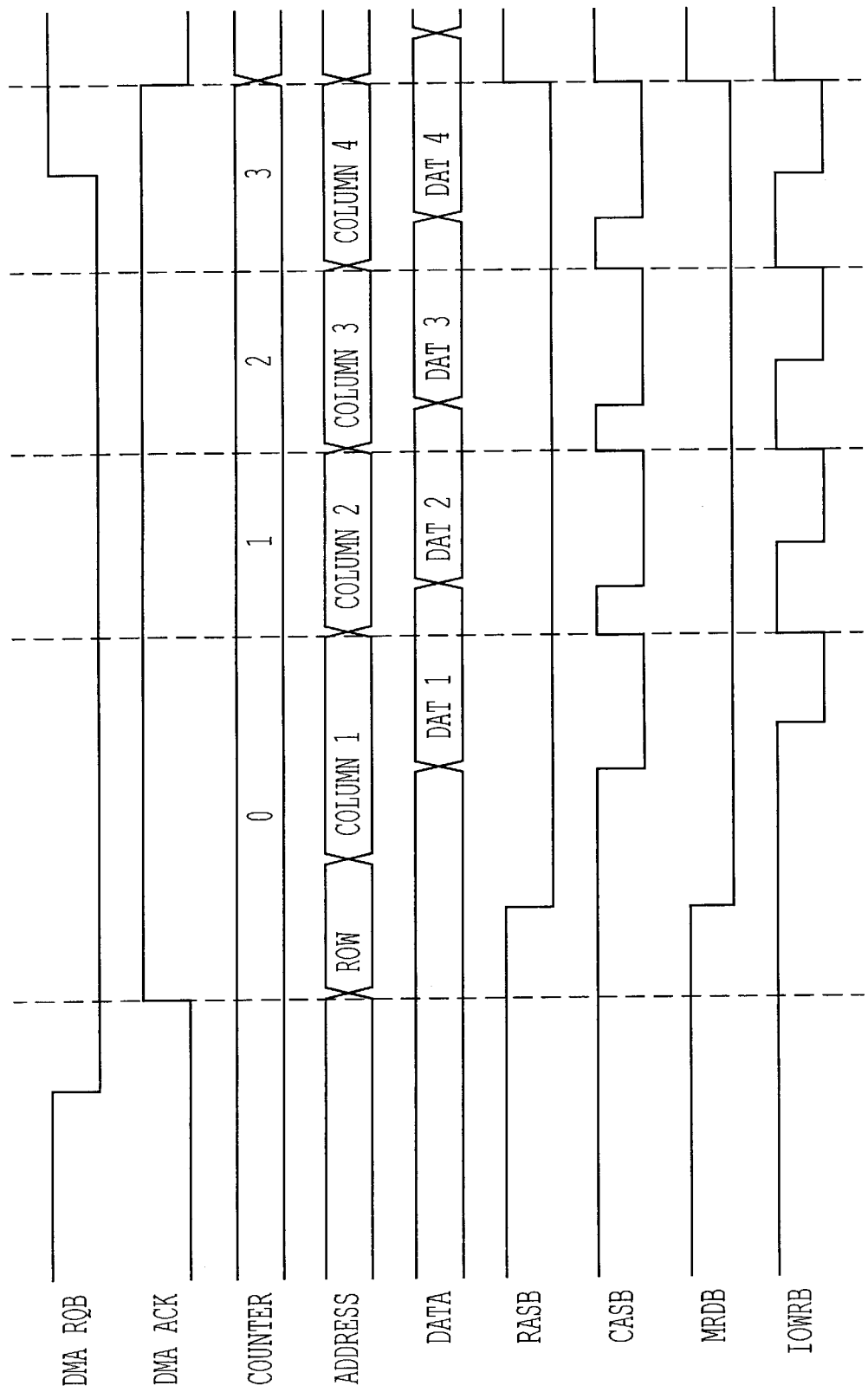
FIG. 4 is a timing chart demonstrating a specific operation of the DMA controller of FIG. 2 for DMA transfer.

Reference will be made to FIG. 4 for describing a specific operation of the DMA controller 10 for DMA transfer. As shown, in response to a single DMA request (DMA RQB) received from the plotter 2, the DMA controller 10 continuously transfers a plurality of words of image data DAT1-DAT4 with the same row address from the page memory 8 to the plotter 2 in the form of a burst. This is effected in the EDO mode (or the high-speed page mode). In the illustrative embodiment, four words of image data are transferred at a time.

In the above condition, the image data are sequentially written to the page memory 8 in the direction of line, so that the column address is also increased by 1 (one) at a time. Because four words to be transferred from the page memory 8 to the plotter 2 must have the same address without exception, an address which can be divided by 4 is set as a column address 1. The column address is sequentially incremented by 1 up to column address 4.

The plotter 2 includes a four-word buffer for accommodating the four words of image data transferred thereto in response to a single DMA request. To buffer a difference in speed between a plot engine, not shown, and DMA, the above four-word buffer is implemented by the two-stage DMA data buffers 31 and 32. In the plotter 2, the image data are transferred from the DMA data buffer 32 including the parallel-to-serial conversion circuit to the plot engine via the record image processing 37. The plot engine records the image data on a paper. When the DMA data buffer 32 becomes empty, the image data stored in the DMA data buffer 31 are transferred to the buffer 32. As a result, the plot engine continuously records image data on the paper.

Subsequently, the plotter 2 sends another DMA request to the DMA controller 10 for storing image data in the DMA data buffer 31. As soon as four words of image data are written to the DMA data buffer 31, the plotter 2 stops sending the DMA request, waits until the DMA data buffer 32 becomes empty, and then repeats the above procedure.

In FIG. 4, there are also shown DMA ACK representative of DMA acknowledgement, COUNTER representative of the count of the burst transfer counter 29, RASB representative of a row address strobe, CASB representative of a column address strobe, MRDB representative of a memory read strobe, and IOWRB representative of an IO (plotter) write strobe.

Figure 5:
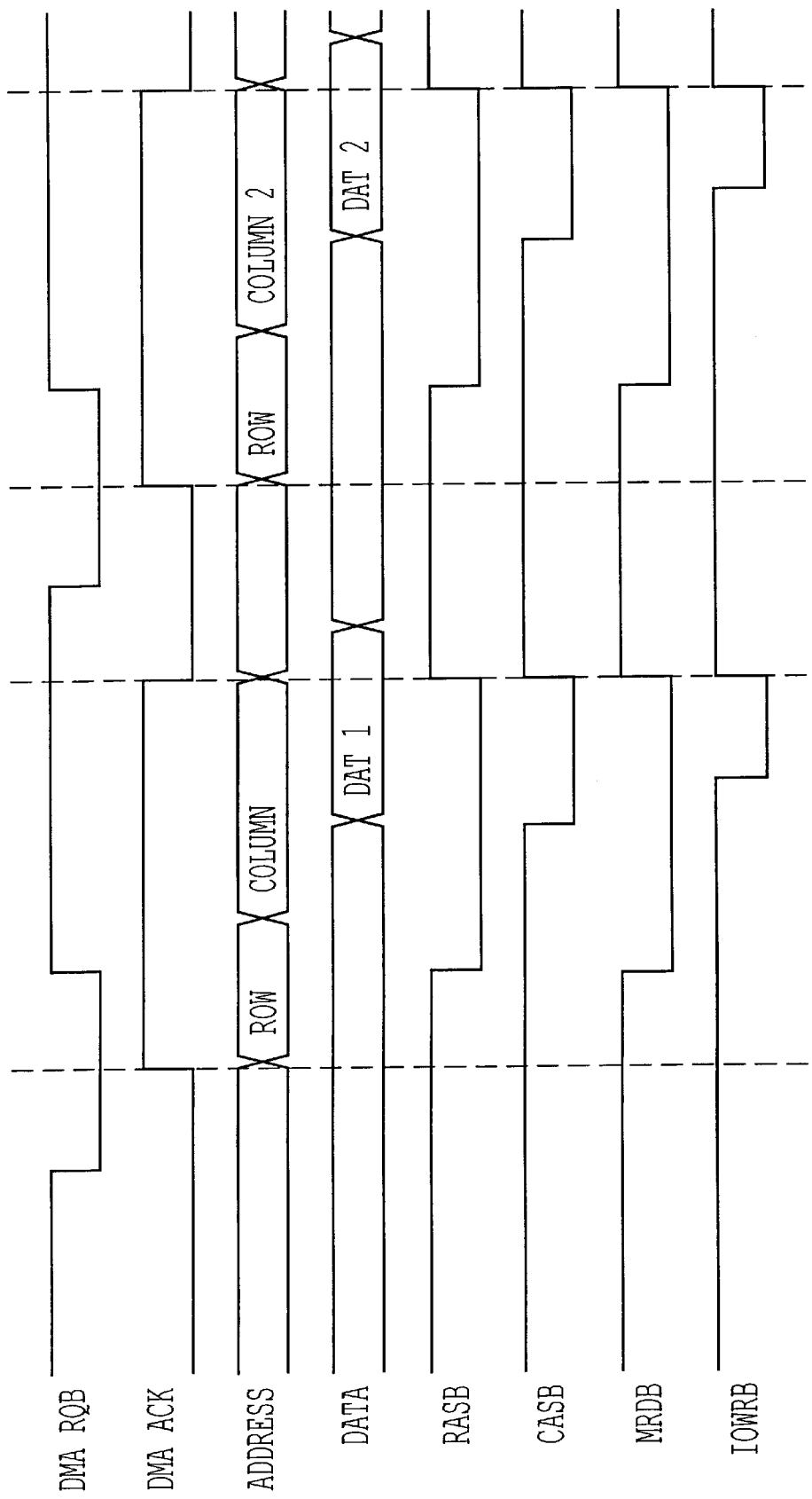
FIG. 5 is a timing chart demonstrating a specific operation of a conventional DMA controller for usual DMA transfer.

As stated above with reference to FIG. 4, the page memory 8 continuously transfers, in response to a single DMA request, a plurality of words of image data with the same row address to the plotter 2 at a time by the DMA scheme. Such a DMA procedure allows image data to be transferred from the page memory 8 to the plotter 2 at a higher rate than a conventional DMA procedure shown in FIG. 5.

Figure 6:
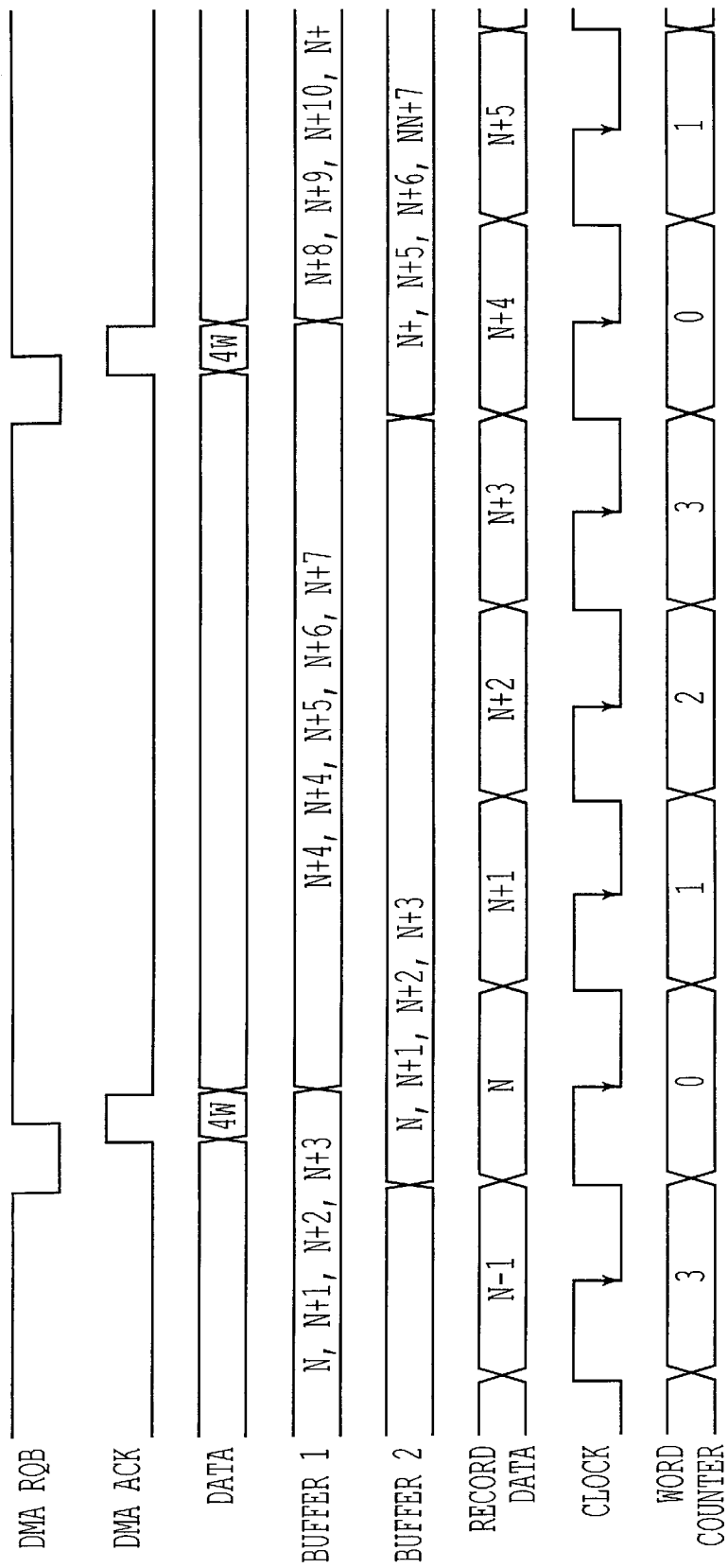
FIG. 6 is a timing chart showing another specific operation of the control arrangement of FIG. 3.

Reference will be made to FIG. 6 for describing a specific DMA transfer procedure which the control arrangement included in the plotter 2 executes. There are shown in FIG. 6 4W representative of four words of image data, BUFFER 1 representative of the DMA buffer 31, BUFFER 2 representative of the DMA data buffer 32, RECORD DATA representative of image data input to the plot engine, and CLOCK representative of a clock signal generated in the plotter 2. The clock signal CLOCK is used to synchronize the writing of image data in the parallel-to-serial conversion circuit of the plot engine.

Figure 7A:
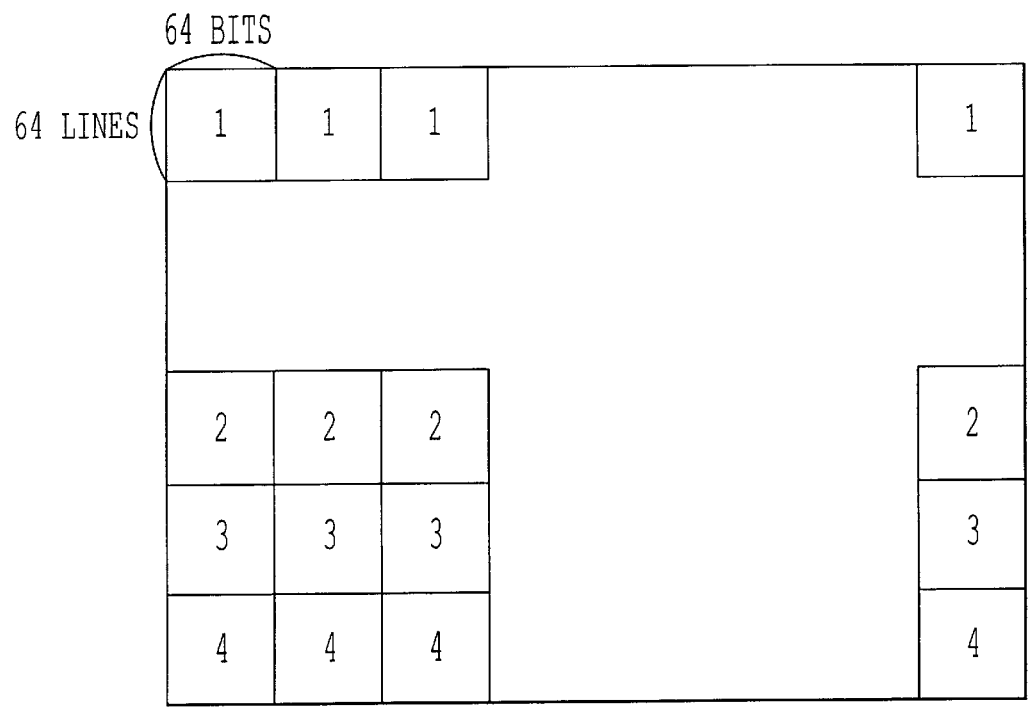
FIGS. 7A and 7B demonstrate another specific DMA transfer procedure available with the DMA controller of the illustrative embodiment.
Figure 7B:
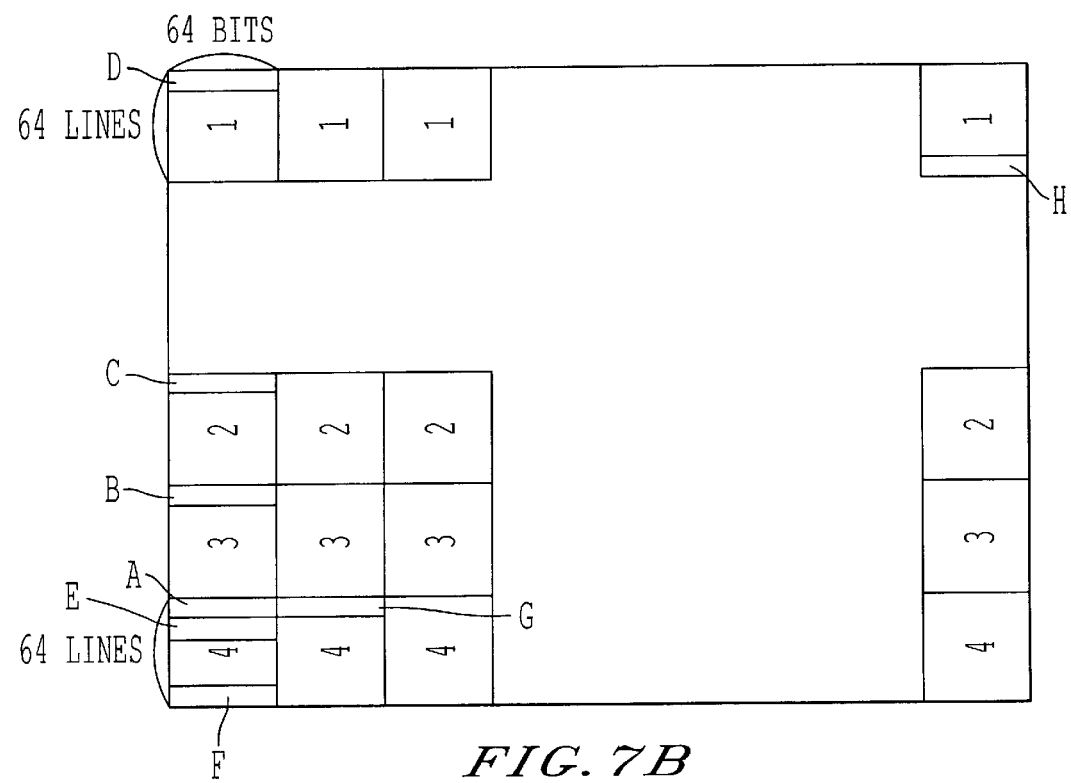

FIGS. 7A and 7B show another specific DMA transfer procedure available with the DMA controller 10 of the illustrative embodiment. For the procedure to be described, one page of image data stored in the page memory 8 are divided into square blocks including four words each. In the specific procedure, each block has 64 (bits)×64 (lines) of image data, as illustrated. The image data are sequentially subjected to vertical/horizontal conversion block by block. Specifically, the DMA controller 10 transfers one page of image data from the page memory 8 to the vertical/horizontal conversion 9. The conversion 9 outputs vertical/horizontal converted image data. The DMA controller 10 returns the converted image data to the same addresses of the page memory 8 by DMA transfer. Subsequently, the DMA controller 10 transfers the converted image data from the page memory 8 to the plotter 2 in a 90-degree or 270-degree rotated condition while controlling the address.

More specifically, assume that one page of image data shown in FIG. 7A are rotated by 270 degrees (vertical/horizontal conversion) to a condition shown in FIG. 7B block by block. Then, to transfer the one whole page of converted data to the plotter 2 in the 270-degree rotation condition, the DMA controller 10 generates addresses such that four words of image data (sixty-four bits) are sequentially transferred to the plotter 2 by DMA transfer at a time in the order of A→B→C→. . . D→E→. . . F→G→. . . H.

In the above case, the EDO mode (or the high-speed page mode) is usable because each block has 64 (bits)×64 (lines) of image data, i.e., because four words of image data can be continuously transferred on the basis of the same row address. By contrast, assume that each block has 16 (bits)×16 (lines) of image data. Then, because the addresses are not continuous, DMA transfer in the EDO mode (or the high-speed page mode) is not practicable.

Figure 8:
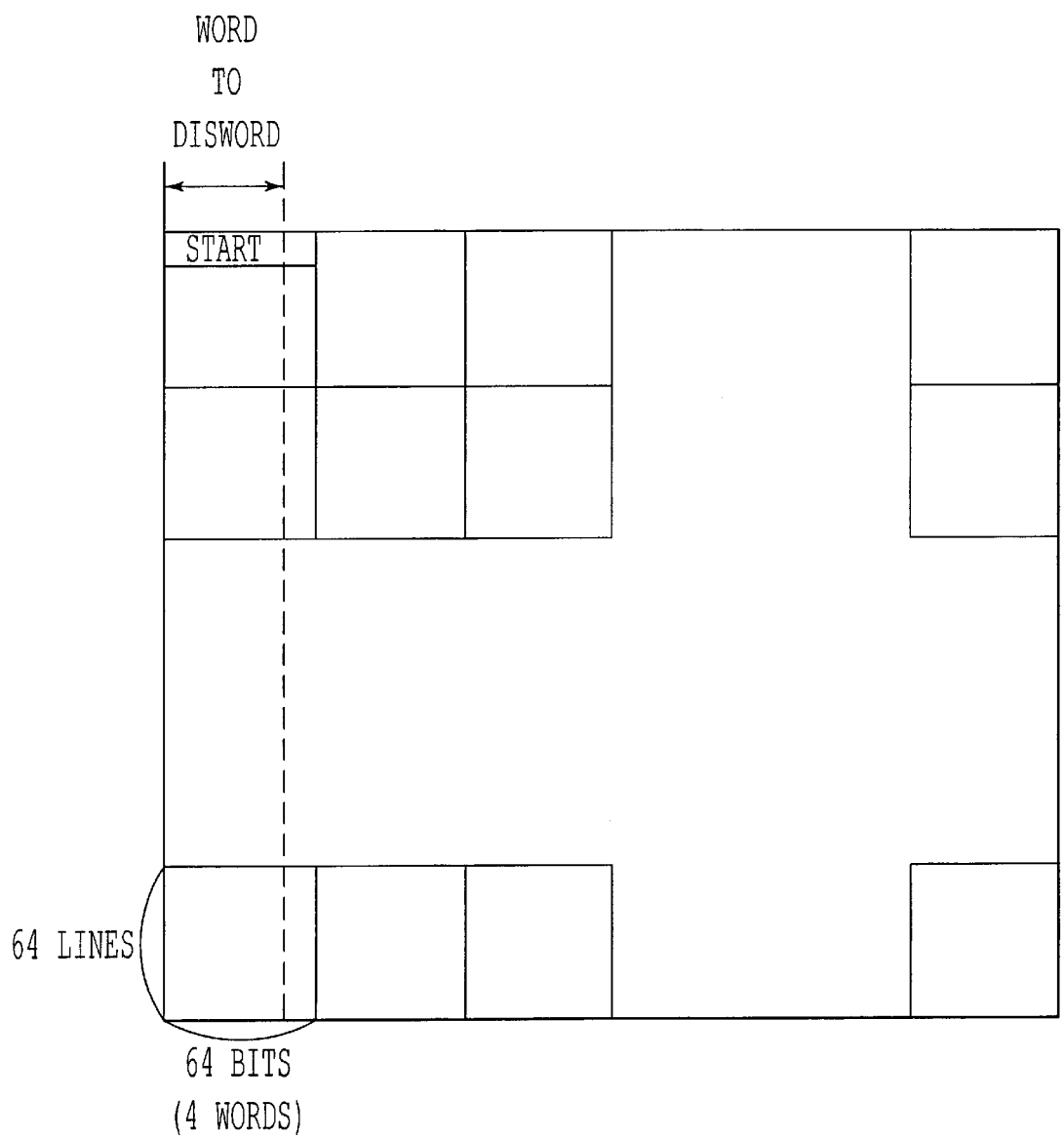

FIGS. 8 and 9 demonstrate still another specific DMA transfer procedure to be executed by the DMA controller 10. As shown in FIG. 8 specifically, the word-to-discard setting 35, FIG. 3, included in the plotter 2 is capable of setting a number of words (number of words to discard as counted from the head of a line) smaller than the number of words (four) of image data to be continuously transferred by the DMA controller 10. Therefore, when four words of image data are transferred by DMA transfer in response to a single DMA request, a DMA start address cannot be set by using a number of words smaller than four. However, by setting a number of words to discard smaller than four, as counted from the head of a line, it is possible to set the record start position of the plot engine on a word basis.

The word-to-discard setting 35 sets a number of words to discard as counted from the head of a line, as stated above. Subsequently, when image data written to the DMA data buffer 32 by the DMA controller 10 are transferred from the buffer 32 to the record image processing 37, the word-to-discard image masking 36 masks image data belonging to the words to be discarded. As a result, such image data are not transferred to the plot engine. FIG. 9 is a timing chart demonstrating the operation of the plotter 2 associated with the above DMA transfer procedure.

While the illustrative embodiment is applied to a facsimile apparatus, the present invention is, of course, applicable to any other image forming apparatus, e.g., a printer or a digital copier.

In summary, it will be seen that the present invention provides an image forming apparatus capable of transferring image data from a DRAM or page memory to image forming means at a high speed by DMA transfer. This is also true when the image data are rotated by 90 degrees or 270 degrees. Further, the apparatus of the present invention is capable of accurately setting a position where the image forming means starts recording image data on a line.

Various modifications will become possible for those skilled in the art after receiving the teachings of the present disclosure without departing from the scope thereof.

What is claimed is:

1. An image forming apparatus comprising:
   image forming means;
   a DRAM functioning as a page memory for storing at least one page of non-compressed image data to be transferred to said image forming means; and
   DMA control means for continuously transferring, in response to a single DMA request received from said image forming means, a plurality of words of image data in the DRAM with a same row address from said DRAM to said image forming means at a time by DMA transfer in which said plurality of words is transferred by sequentially switching a column address.

2. An apparatus as claimed in claim 1, further comprising:
   vertical/horizontal converting means for converting one page of image data stored in said DRAM in a vertical/horizontal direction on the basis of a square block including a plurality of words; and
   address generating means included in said DMA control means for generating addresses for transferring converted image data output from said vertical/horizontal converting means to said image forming means in a 90-degree or 270-degree rotated condition.

3. An apparatus as claimed in claim 1, wherein said image forming means includes:
   word setting means for setting a number of words smaller than a number of words of image data to be continuously transferred by said DMA control means by DMA transfer at a time; and
   masking means for masking, among the image data transferred by said DMA controller by DMA transfer, image data belonging to the number of words set by said word setting means, as counted from a head of a line.

4. An image forming apparatus comprising:
   an image forming unit;
   a DRAM configured as a page memory to store at least one page of non-compressed image data to be transferred to said image forming unit; and
   a DMA controller configured to continuously transfer, in response to a single DMA request received from said image forming unit, a plurality of words of image data in the DRAM with a same row address from said DRAM to said image forming unit at a time by DMA transfer in which said plurality of words is transferred by sequentially switching a column address.

5. An apparatus as claimed in claim 4, further comprising:
   a vertical/horizontal converter configured to convert one page of image data stored in said DRAM in a vertical/horizontal direction on a basis of a square block including a plurality of words; and
   an address generator included in said DMA controller and configured to generate addresses that transfer converted image data output from said vertical/horizontal converter to said image forming unit in a 90-degree or 270-degree rotated condition.

6. An apparatus as claimed in claim 4, wherein said image forming unit comprises:

a word setting device configured to set a number of words smaller than a number of words of the image data transferred by said DMA controller; and a masking device configured to mask, among the image data transferred by said DMA controller, image data belonging to the number of words set by said word setting unit, as counted from a head of a line.

7. An apparatus as claimed in claim 4, further comprising:

first and second data buffers configured to buffer a speed between the image forming unit and said DMA controller;

said DMA controller configured to transfer the image data to the first buffer upon a request from the image forming unit;

said first buffer configured to transfer the image data to the second buffer when the second buffer becomes empty; and said second buffer configured to transfer the image data to the image forming unit.

8. An image forming apparatus comprising:

image forming means;

a DRAM functioning as a page memory for storing at least one page of non-compressed image data to be transferred to said image forming means;

DMA control means for continuously transferring, in response to a single DMA request received from said image forming means, a plurality of words of image data in the DRAM with a same row address from said DRAM to said image forming means at a time by DMA transfer in which said plurality of words is transferred by sequentially switching a column address;

a first buffer configured to receive the image data from the DRAM;

a second buffer configured to receive the image data from the first buffer and configured to provide the image data to the image forming means; and said first buffer configured to transfer the image data to the second buffer as soon as the second buffer has emptied the image data to the image forming means.

9. The image forming apparatus of claim 8, wherein the first buffer receives the image data upon the single DMA request received from said image forming means.

10. An image forming apparatus comprising:

an image forming unit;

a DRAM configured as a page memory to store at least one page of non-compressed image data to be transferred to said image forming unit;

a DMA controller configured to continuously transfer, in response to a single DMA request received from said image forming unit, a plurality of words of image data in the DRAM with a same row address from said DRAM to said image forming unit at a time by DMA transfer in which said plurality of words is transferred by sequentially switching a column address;

a first buffer configured to receive the image data from the DRAM;

a second buffer configured to receive the image data from the first buffer and configured to provide the image data to the image forming means; and said first buffer configured to transfer the image data to the second buffer as soon as the second buffer has emptied the image data to the image forming means.

11. The image forming apparatus of claim 8, wherein the first buffer receives the image data upon the single DMA request received from said image forming unit.

* * * * *